United States Patent
Matsuda

(10) Patent No.: US 7,962,663 B2
(45) Date of Patent: Jun. 14, 2011

(54) SIGNAL INPUT SYSTEM SETS VIDEO OUTPUT BASED ON FORMAT OF VIDEO SIGNAL ACCORDING TO VOLTAGE VALUE OF RECEIVED FORMAT SIGNAL

(75) Inventor: Syuhei Matsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 291 days.

(21) Appl. No.: 12/121,058

(22) Filed: May 15, 2008

(65) Prior Publication Data
US 2009/0024767 A1    Jan. 22, 2009

(30) Foreign Application Priority Data

May 18, 2007    (JP) .................................. 2007-132861

(51) Int. Cl.
*G06F 3/00* (2006.01)
*G06F 13/00* (2006.01)

(52) U.S. Cl. ............................... 710/15; 710/8; 710/104
(58) Field of Classification Search ...................... 710/15
See application file for complete search history.

(56) References Cited

U.S. PATENT DOCUMENTS

| | | | |
|---|---|---|---|
| 2006/0077298 A1* | 4/2006 | Gotanda et al. ............... | 348/558 |
| 2007/0164861 A1* | 7/2007 | Sano ........................... | 340/568.4 |
| 2007/0210174 A1* | 9/2007 | Deprun et al. ................. | 235/492 |
| 2007/0283071 A1* | 12/2007 | Konishi ........................ | 710/302 |
| 2008/0084834 A1* | 4/2008 | Stanek ........................... | 370/284 |
| 2008/0263621 A1* | 10/2008 | Austerlitz et al. ............ | 725/139 |

FOREIGN PATENT DOCUMENTS

JP    2002-247474 A    8/2002

* cited by examiner

*Primary Examiner* — Chun-Kuan Lee
*Assistant Examiner* — Brooke J Dews
(74) *Attorney, Agent, or Firm* — Crowell & Moring LLP

(57) ABSTRACT

Disclosed is a signal input system to input an image signal from source equipment to sink equipment through a High Definition Multimedia Interface, wherein the source equipment comprises a transmission section to transmit a format signal to the sink equipment through a predetermined first line in the High Definition Multimedia Interface, the format signal having a voltage value corresponding to a format of the image signal and the sink equipment comprises: a reception section to receive the format signal transmitted through the first line by the transmission section; a judging section to judge the format of the image signal based on the voltage value of the format signal which is received by the reception section; and a setting section to set an image output based on a judgment result of the judging section.

5 Claims, 11 Drawing Sheets

*4722c*

| VOLTAGE VALUE (FIRST SOUND FORMAT LINE) | CORRESPONDING FORMAT (AUDIO TYPE) |
|---|---|
| 5V | PCM |
| 4.5V | AC-3 |
| 4V | MPEG1 |
| 3.5V | MP3 |
| 3V | MPEG2 |
| 2.5V | AAC |
| 2V | DTS |
| 1.5V | ATRAC |
| 0V | NO SIGNALS |

| VOLTAGE VALUE (HOT PLUG LINE) | CORRESPONDING IMAGE FORMAT (NUMBER OF EFFECTIVE SCANNING LINES · SCANNING METHOD) |
|---|---|
| 5V | 1080p |
| 4V | 720p |
| 3V | 1080i |
| 2V | 480p |
| 1V | 480i |
| 0V | NO SIGNALS |

| EQUIPMENT ID | SET FORMAT |
|---|---|
| 001 | 480i |
| 002 | 1080i |
| 003 | 720p |

| VOLTAGE VALUE (FIRST SOUND FORMAT LINE) | CORRESPONDING FORMAT (AUDIO TYPE) |
|---|---|
| 5V | PCM |
| 4.5V | AC-3 |
| 4V | MPEG1 |
| 3.5V | MP3 |
| 3V | MPEG2 |
| 2.5V | AAC |
| 2V | DTS |
| 1.5V | ATRAC |
| 0V | NO SIGNALS |

| VOLTAGE VALUE (SECOND SOUND FORMAT LINE) | CORRESPONDING FORMAT (SAMPLING FREQUENCY) |
|---|---|
| 5V | 32kHz |
| 4.5V | 44.1kHz |
| 4V | 48kHz |
| 3.5V | 88.2kHz |
| 3V | 96kHz |
| 2.5V | 176.4kHz |
| 2V | 192kHz |
| 0V | NO SIGNALS |

| EQUIPMENT ID | SET FORMAT (NUMBER OF EFFECTIVE SCANNING LINES · SCANNING METHOD) | SET FORMAT (AUDIO TYPE) | SET FORMAT (SAMPLING FREQUENCY) |
|---|---|---|---|
| 001 | 480i | AC-3 | – |
| 002 | 1080i | MPEG2 | – |
| 003 | 720p | PCM | 48kHz |

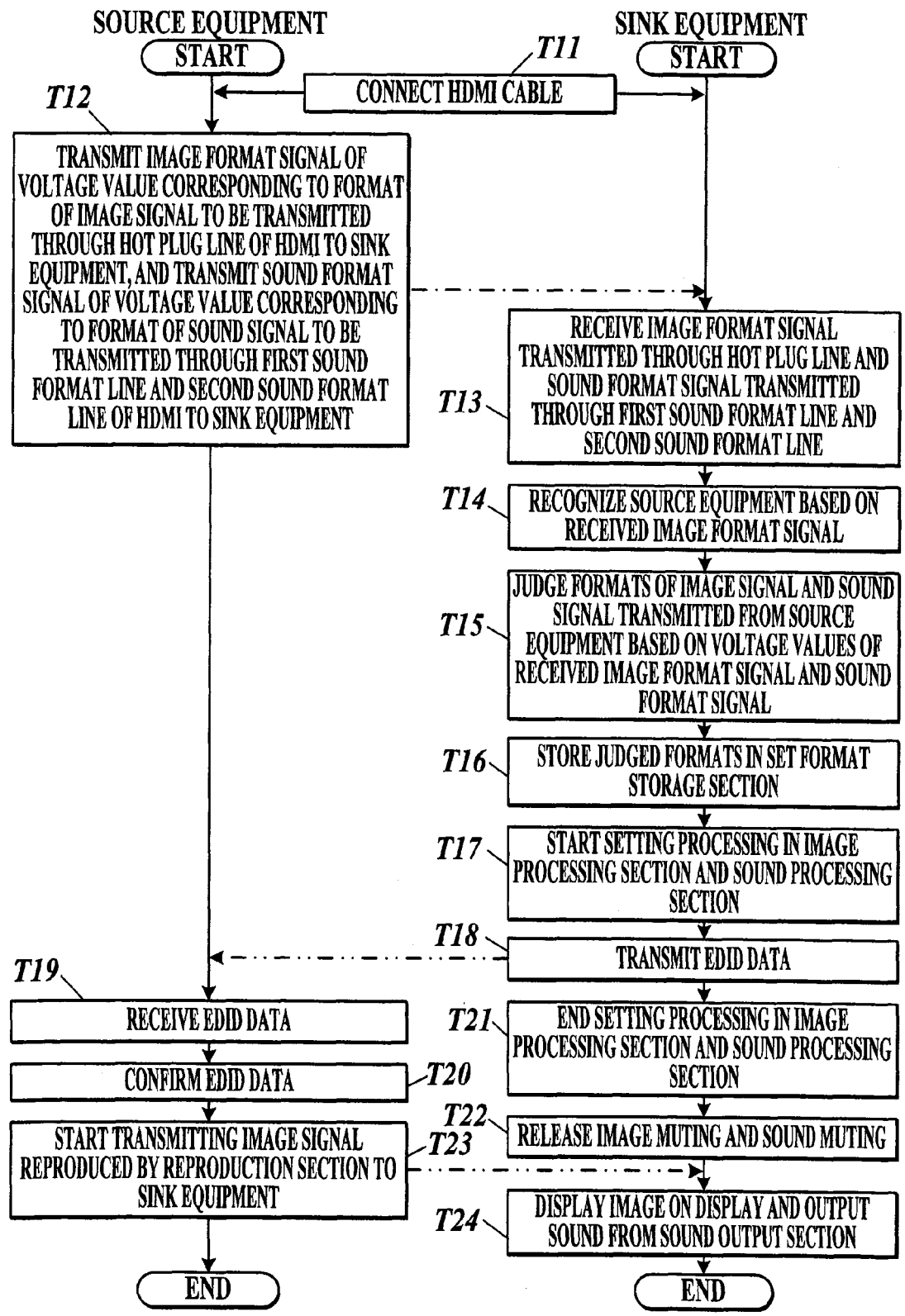

SIGNAL INPUT SYSTEM SETS VIDEO OUTPUT BASED ON FORMAT OF VIDEO SIGNAL ACCORDING TO VOLTAGE VALUE OF RECEIVED FORMAT SIGNAL

BACKGROUND OF THE INVENTION

1. Field of the Invention

The present invention relates to a signal input system to perform the transmission and the reception of a signal between source equipment and sink equipment.

2. Description of Related Art

In recent years, a standard called as High Definition Multimedia Interface (HDMI) which is the standard of expanding Digital Visual Interface (DVI), has been put to practical use. HDMI can transmit an image signal and a sound signal that take digital form and are not compressed in a plurality of formats.

However, a conventional signal input system has a problem of an excessive long time from the connection of a piece of source equipment with a piece of sink equipment to the display of an image on the sink equipment side.

To put it concretely, in order to output an image and the like in the conventional signal input system, the connection of both the pieces of equipment is first detected on the basis of a hot plug signal transmitted through a hot plug line. After that, the sink equipment transmits extended display identification data (EDID) indicating the format and the like of an image signal that the sink equipment deals with, to the source equipment. The EDID is the data indicating the formats of the image signal in the sink equipment (for example, the display resolution thereof, the image frame period thereof, and the signal format thereof) and the formats of a sound signal (for example, the number of sample bits thereof, the sampling frequency thereof, and the signal format thereof), and is subjected to transmission and reception through display data channel (DDC) lines. Then, the source equipment converts the image signal into a predetermined format on the basis of the received EDID, and transmits the image signal to the sink equipment together with info information. On the other hand, the sink equipment sets an image IC and the like on the basis of the info information transmitted from the source equipment, and then releases muting. The image display based on the image signal transmitted from the source equipment is thus started.

For example, Japanese Patent Application Laid-Open Publication No. 2002-247474 discloses a display control apparatus to receive the information of display resolution from a television monitor by examining the voltage level of a signal through an image terminal, and can automatically perform the optimum display using a region of the monitor in which a display can be performed by performing the display according to the resolution.

According to the Japanese Patent Application Laid-Open Publication No. 2002-247474, the display resolution can be detected on the basis of the voltage level of the signal from the image terminal in place of the EDID.

However, even when the technique of the Japanese Patent Application Laid-Open Publication No. 2002-247474 is applied to the signal input system performed by the source equipment and the sink equipment connected to each other with an HDMI cable, the source equipment and the sink equipment detect the mutual connection with the HDMI cable; after that, the display resolution of the image signal is detected on the basis of the voltage level of the signal from the image terminal; and the setting of the image IC and the like are then performed on the basis of the detected display resolution. No images can be output until the above processing has been performed, and consequently the problem of the delay before the display of an image still remains.

SUMMARY OF THE INVENTION

It is, therefore, a main object of the present invention to shorten the time from the connection of source equipment and sink equipment with each other by HDMI to an image output.

According to an aspect of the present invention, there is provided a signal input system to input an image signal from source equipment to sink equipment through a High Definition Multimedia Interface, wherein the source equipment comprises a transmission section to transmit a format signal to the sink equipment through a predetermined first line in the High Definition Multimedia Interface, the format signal having a voltage value corresponding to a format of the image signal and the sink equipment comprises:

a reception section to receive the format signal transmitted through the first line by the transmission section;

a judging section to judge the format of the image signal based on the voltage value of the format signal which is received by the reception section; and a setting section to set an image output based on a judgment result of the judging section.

According to another aspect of the present invention, there is provided a signal input system to input an image signal and a sound signal from source equipment to sink equipment through a High Definition Multimedia Interface, wherein the source equipment comprises:

a first transmission section to transmit a first format signal to the sink equipment through a predetermined first line in the High Definition Multimedia Interface, the first format signal having a voltage value corresponding to a format of the image signal; and a second transmission section to transmit a second format signal to the sink equipment through a predetermined second line in the High Definition Multimedia Interface, the second format signal having a voltage value corresponding to a format of the sound signal, and the sink equipment comprises:

a first reception section to receive the first format signal transmitted through the first line by the first transmission section;

a second reception section to receive the second format signal transmitted through the second line by the second transmission section;

a first judging section to judge the format of the image signal based on the voltage value of the first format signal which is received by the first reception section;

a second judging section to judge the format of the sound signal based on the voltage value of the second format signal which is received by the second reception section;

a first setting section to set an image output based on a judgment result of the first judging section; and a second setting section to set a sound output based on a judgment result of the second judging section, and wherein the first line is a line to perform a transmission and a reception of a hot plug signal which indicates that the source equipment and the sink equipment are connected to each other, and either one of the first format signal and the second format signal has a function as the hot plug signal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a diagram to illustrate a corresponding image format storage section;

FIG. 5 is a diagram to illustrate a set format storage section provided in the signal input system of the first embodiment;

FIG. 10 is a diagram to illustrate a first corresponding sound format storage section provided in the signal input system of the second embodiment;

FIG. 11 is a diagram to illustrate a second corresponding sound format storage section provided in the signal input system of the second embodiment;

FIG. 12 is a diagram to illustrate a set format storage section provided in the signal input system of the second embodiment; and FIG. 13 is a flowchart showing the image and sound transmission and reception processing performed in the signal input system of the second embodiment.

DETAILED DESCRIPTION OF THE PREFERRED EMBODIMENTS

In the following, the preferred embodiments of the present invention will be described with reference to the attached drawings.

First Embodiment

Figure 1:
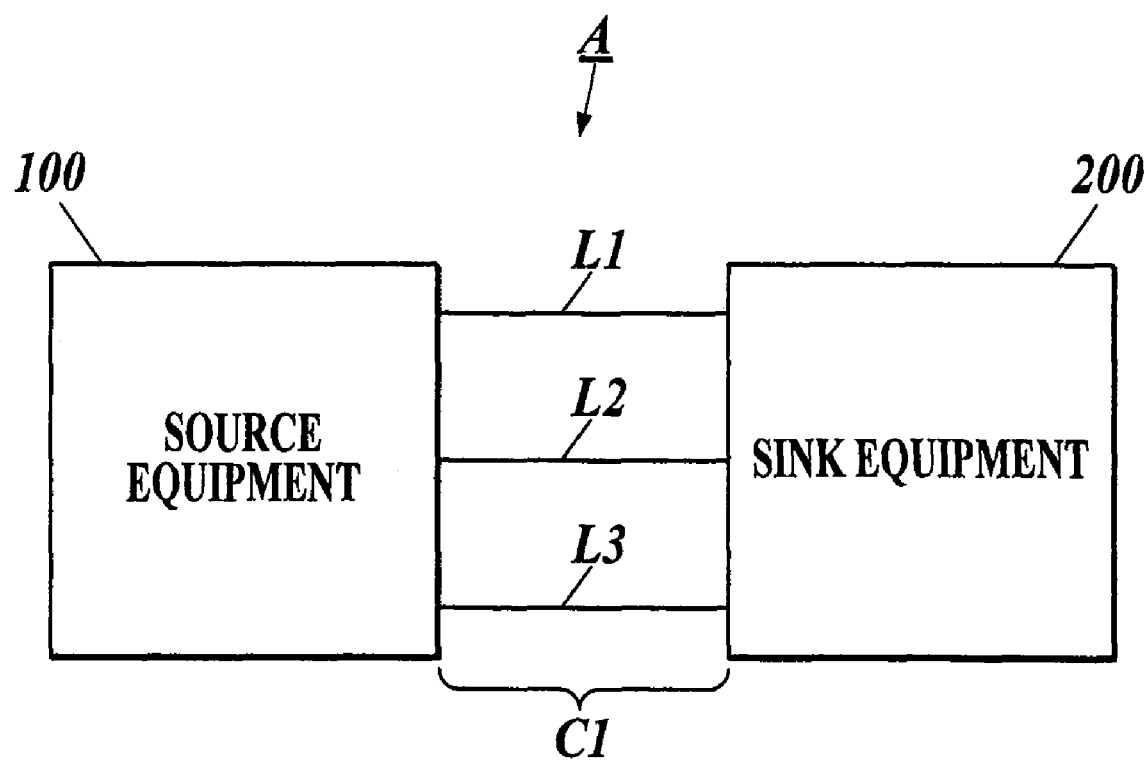
FIG. 1 is a block diagram to illustrate the whole configuration of the signal input system of a first embodiment.

The whole configuration of a signal input system A of a first embodiment is first described with reference to FIG. 1.

In the signal input system A of the present first embodiment, a piece of source equipment 100 and a piece of sink equipment 200 are connected to each other with a HDMI cable C1 based on the HDMI standard, and an image signal and a sound signal are transmitted from the source equipment 100 to the sink equipment 200.

The HDMI cable C1 comprises, for example, a transmission minimized differential signaling (TMDS) line L1 for transmitting and receiving an image signal and a sound signal in the TMDS format, a DDC line L2 for transmitting and receiving EDID, a hot plug line L3 (first line) for detecting the connection of the source equipment 100 and the sink equipment 200 with each other, and the like. The hot plug line L3 is a line for transmitting a hot plug signal indicating the connection state of the HDMI cable C1, and is configured to connect the control sections 16 and 27 (see FIGS. 2 and 3) of the source equipment 100 and the sink equipment 200, respectively, with each other so that the transmission and the reception of signals between both the control sections 16 and 27 of both the pieces of equipment 100 and 200, respectively, may be performed at the fastest speed. Incidentally, the hot plug line L3 is assigned to, for example, a $19^{th}$ pin in each of the pin arrangements of HDMI terminals 141 and 211.

The signal input system A of the present first embodiment makes the voltage value of a signal transmitted through the hot plug line L3 changeable according to the format of an image signal transmitted from the side of the source equipment 100 to the side of the sink equipment 200, and uses the voltage value as a format signal to indicate the fact of the connection of both the equipment 100 and 200 with each other and to indicate the format of the transmitted image signal. Thereby the signal input system A realizes the shortening of the time from the judgment of cable connection to an image output.

Moreover, the description of the signal input system A of the present first embodiment is performed as that the formats of the image signal indicated by format signals concern the number of scanning lines (number of effective scanning lines) of the image signal and the scanning method thereof (that is, interlace/progressive scans). However, the formats of the image signals indicated by format signals may not be limited to those ones. Moreover, the kind of the line through which the format signal is transmitted is not also limited to the hot plug line L3, but the format signal may be transmitted by using two or more lines according to the content of the format signals to be transmitted.

(Configuration of Source Equipment)

Figure 2:
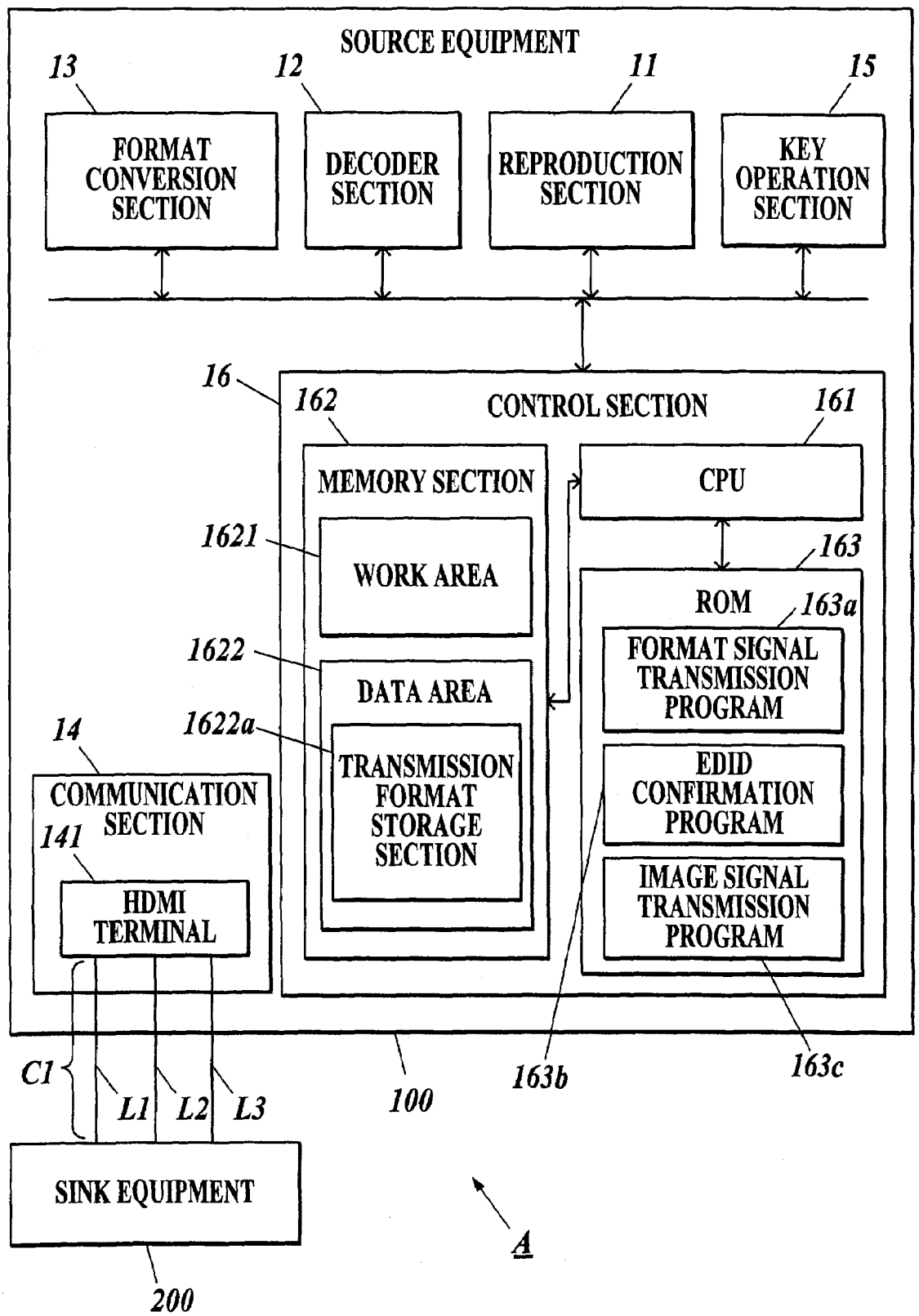
FIG. 2 is a block diagram to illustrate the configuration of the principal part of the source equipment constituting the signal input system of the first embodiment.

Next, the configuration of the source equipment 100 will be described with reference to FIG. 2. The source equipment 100 is a reproduction apparatus such as a digital versatile disc (DVD) player, and is connected to the sink equipment 200 with the HDMI cable C1. The source equipment 100 reproduces the image signal and the like recorded in a DVD, and transmits the reproduced image signal to the sink equipment 200.

The source equipment 100 comprises, for example, a reproduction section 11 to read image data recorded on a not-shown DVD, a decoder section 12 to perform predetermined decoding processing to the image data read by the reproduction section 11, a format conversion section 13 to convert the image format of the image data output from the decoder section 12 into a predetermined image format in accordance with an instruction of the control section 16, a communication section 14 to transmit the image data input from the format conversion section 13 to external equipment, such as the sink equipment 200, a key operation section 15 to enable a user to input various instructions, the control section 16 to perform the integrated control of each section of the source equipment 100, and the like.

The reproduction section 11 reads the image data and the like recorded on the DVD by, for example, radiating a laser light to the reflection layer of the DVD to generate a voltage signal according to the reflected light by photoelectric conversion and current-voltage conversion, and outputs the read image data and the like to the decoder section 12.

The decoder section 12 comprises, for example, a separation section, a video decoder, an audio decoder, and the like, although they are omitted to be shown. The separation section separates the content data input from the reproduction section 11 into a plurality of pieces of data such as image data, sound data, sub-image data, and the like, and outputs the separated image data and the separated sound data to the video decoder and the audio decoder, respectively. Then, the separated image data and the separated sound data are decoded in the video decoder and the audio decoder, respectively.

The format conversion section 13 comprises, for example, an expansion filter, a reduction filter, an image memory, and the like, although they are omitted to be shown. The format conversion section 13 converts the image signal output form the decoder section 12 into the format that is stored in a transmission format storage section 1622a to output the converted image signal to the communication section 14 under the control of the control section 16 in the execution of an image signal transmission program 163c, which will be described later.

To put it concretely, when the image format of the input image data has lower resolution than that of the image format to be transmitted, then the format conversion section 13 performs the high resolution conversion processing of the input image data by expanding the image format of the image data with the expansion filter at the time of reading the image signal written in the image memory. Moreover, when the image format of the input image data has higher resolution than that of the image format to be transmitted, then the format conversion section 13 performs the low resolution conversion processing of the input image data by reducing the image format of the image data with the reduction filter at the time of writing the image data into the image memory. Moreover, when the format of the image data input from the decoder section 12 is the same as the image format stored in a format storage section, then the format conversion section 13 does not perform any format conversion and outputs the input image data to the subsequent stage.

The communication section 14 is equipped with an HDMI terminal 141 based on the HDMI standard, and performs the transmission of various signals of an image signal and a control signal with the sink equipment 200 through the HDMI cable C1 connecting the HDMI terminal 141 with an HDMI terminal 211 (described below) provided in the sink equipment 200.

To put it concretely, the communication section 14 transmits a format signal, indicating the connection state of the sink equipment 200 and the source equipment 100, and indicating the format of an image signal to be transmitted, to the side of the sink equipment 200 through the hot plug line L3 of the HDMI cable C1 in the execution of a format signal transmission program 163a to be described below.

Moreover, the communication section 14 transmits the image signal reproduced in the reproduction section 11 to the sink equipment 200 through the TMDS line L1 of the HDMI cable C1 in the execution of an image signal transmission program 163c to be described below.

The key operation section 15 is equipped with, for example, a plurality of keys for a user to input various instructions. When a user performs a depression operation of a key, then the key operation section 15 outputs an input operation signal corresponding to the depressed key to the control section 16.

The control section 16 comprises a central processing unit (CPU) 161, a memory section 162, a read only memory (ROM) 163, and the like.

The CPU 161 executes various programs stored in the ROM 163 according to an input signal input from each section of the source equipment 100, input operation signal based on a depression operation of various keys in the key operation section 15, and the like, and outputs an output signal to each section of the source equipment 100 on the basis of the executed program to perform the integrated control of the whole operation of the source equipment 100.

The memory section 162 includes a work area 1621 made of a volatile memory, such as a random access memory (RAM), and the memory section 162 makes the work area 1621 store a processing result generated at the time of the execution of the various programs by the CPU 161, input data, and the like.

Moreover, the memory section 162 includes a data area 1622 made of a nonvolatile memory, such as an erasable programmable ROM (EPROM). The data area 1622 is provided with, for example, the transmission format storage section 1622a.

The transmission format storage section 1622a stores the format of an image signal to be transmitted to the sink equipment 200, and the format of the image signal is converted into the format based on the one stored in the transmission format storage section 1622a. Then the converted image signal is transmitted.

The ROM 163 includes a program storage area made of, for example, a nonvolatile memory, and, to put it concretely, stores the format signal transmission program 163a, an EDID confirmation program 163b, the image signal transmission program 163c, and the like.

The format signal transmission program 163a is a program to enable the CPU 161 to realize, for example, the function of transmitting the format signal of the voltage value corresponding to the format of an image signal to the sink equipment 200 through the hot plug line L3 in the HDMI.

To put it concretely, the CPU 161 monitors the voltage value of the hot plug line L3, through which the format signal indicating the connection of the sink equipment 200 is supplied, with a not-shown voltage detection circuit, and generates a format signal of the voltage value corresponding to the format of the image signal to be transmitted to the sink equipment 200 on the basis of the transmission format storage section 1622a. Then, when the source equipment 100 and the sink equipment 200 are connected to each other with the HDMI cable C1, then the generated format signal is transmitted from the HDMI terminal 141 of the communication section 14 to the sink equipment 200 through the hot plug line L3 of the HDMI cable C1. The format signal functions of indicating the connection of the source equipment 100 to the sink equipment 200, and functions of informing the side of the sink equipment 200 of the format of the image signal to be transmitted from the source equipment 100 to the sink equipment 200.

The CPU 161 functions as a transmission section together with the HDMI terminal 141 by executing this format signal transmission program 163a.

The EDID confirmation program 163b is a program to enable the CPU 161 to realize, for example, the function of receiving EDID transmitted from the sink equipment 200 though the HDMI to confirm the format of an image signal to be transmitted.

To put it concretely, when the EDID, which is the data pertaining to an image format that the sink equipment 200 can display, is transmitted from the sink equipment 200 through the DDC line L2 of the HDMI cable C1, the CPU 161 receives the EDID through the HDMI terminal 141 of the communication section 14, and judges whether the sink equipment 200 can deal with the format of the image signal to be transmitted from the side of the source equipment 100 or not on the basis of the received EDID.

The image signal transmission program 163c is a program to enable the CPU 161 to realize, for example, the function of transmitting an image signal from the HDMI terminal 141 of the communication section 14 to the sink equipment 200 through the HDMI cable C1.

To put it concretely, the CPU 161 judges whether the sink equipment 200 can deal with the format of an image signal to be transmitted or not on the basis of the EDID transmitted from the sink equipment 200 in the execution of the EDID confirmation program 163*b*. When the CPU 161 judges that the sink equipment 200 can deal with the format of the image data to be transmitted, then the CPU 161 makes the format conversion section 13 convert the format of the image signal reproduced by the reproduction section 11 into the format stored in the transmission format storage section 1622*a*, and transmits the converted image signal to the sink equipment 200 through the TMDS line L1 of the HDMI cable C1. Moreover, when the CPU 161 judges that the sink equipment 200 cannot deal with the format of the image signal to be transmitted, then the CPU 161 makes the format conversion section 13 convert the image signal reproduced by the reproduction section 11 to a subordinate format than the format stored in the transmission format storage section 1622*a* on the basis of the received EDID, and transmits the converted image signal to the sink equipment 200 through the TMDS line L1 of the HDMI cable C1.

(Configuration of Sink Equipment)

Figure 3:
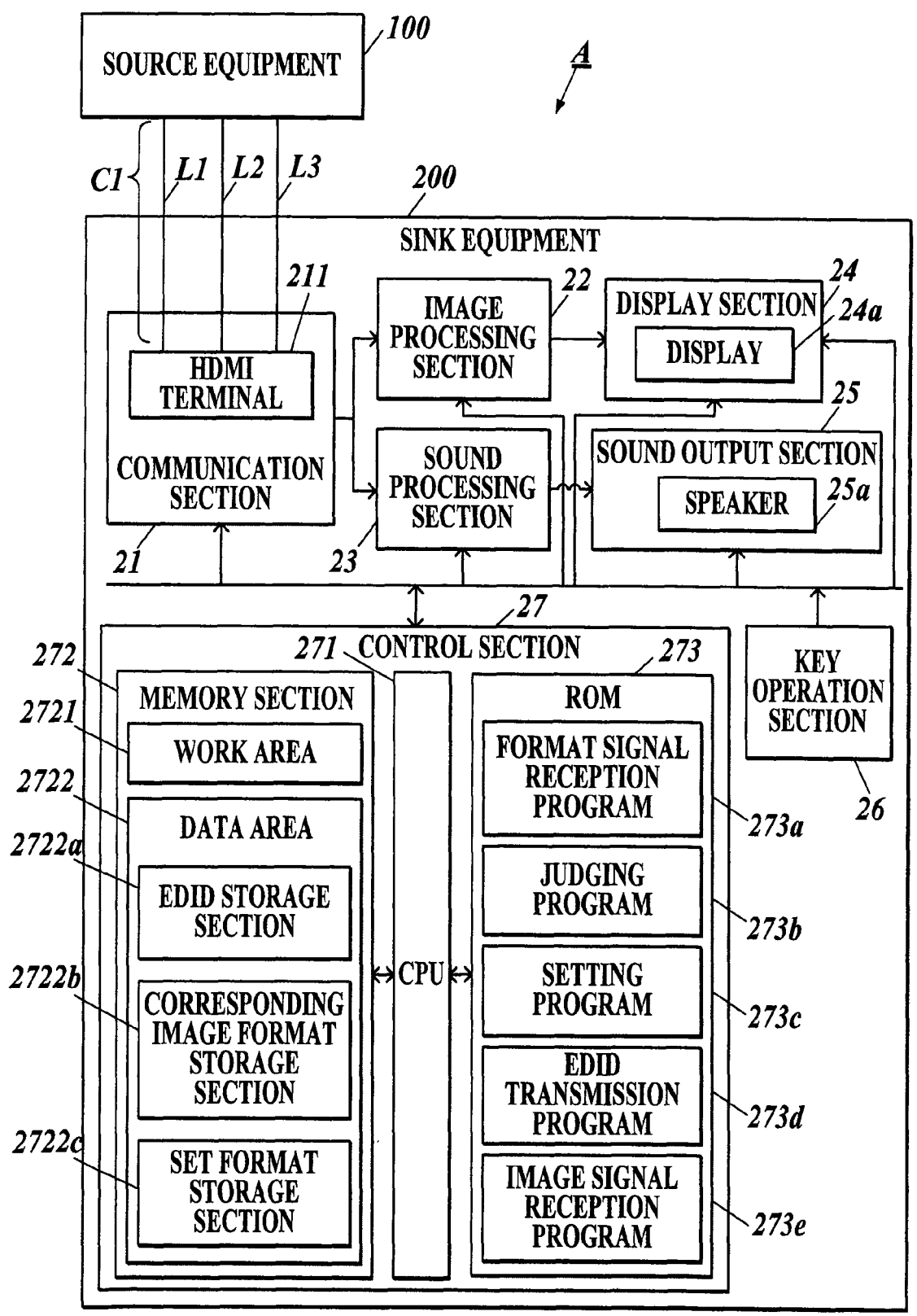
FIG. 3 is a block diagram to illustrate the configuration of the principal part of the sink equipment constituting the signal input system of the first embodiment.

Next, the configuration of the sink equipment 200 is described with reference to FIG. 3. The sink equipment 200 is a display apparatus, such as a television receiver, and is connected to the source equipment 100 with the HDMI cable C1. Then, the sink equipment 200 makes a display 24*a* display an image on the basis of an image signal input from the source equipment 100.

The sink equipment 200 comprises a communication section 21 to transmit various signals such as an image signal and a control signal to external equipment such as the source equipment 100, an image processing section 22 to perform predetermined image processing to an image signal, a sound processing section 23 to perform predetermined sound processing to a sound signal, a display section 24 to display an image on the basis of image data input from the image processing section 22, a sound output section 25 to output a sound on the basis of sound data input from the sound processing section 23, a key operation section 26 to enable a user to input various instructions, the control section 27 to perform the integrated control of each section of the sink equipment 200, and the like.

The communication section 21 includes the HDMI terminal 211 based on the HDMI standard, and transmits various signals such as an image signal and a control signal to the source equipment 100 through the HDMI cable C1 connecting the HDMI terminal 211 with the HDMI terminal 141 of the source equipment 100.

To put it concretely, the communication section 21 receives a format signal transmitted from the source equipment 100 through the hot plug line L3 of the HDMI cable C1 in the execution of a format signal reception program 273*a*, which will be described below. Moreover, the communication section 21 receives an image signal transmitted from the source equipment 100 through the TMDS line L1 of the HDMI cable C1 in the execution of an image signal reception program 273*e*, which will be described below.

The image processing section 22 performs various kinds of image processing to input image data to generate an image signal, and outputs the generated image signal to the display section 24.

The sound processing section 23 performs various kinds of sound processing to sound data input from a switching section to generate a sound signal, and outputs the generated sound signal to the sound output section 25.

The display section 24 is equipped with a display 24*a* such as a liquid crystal display (LCD), and makes the display 24*a* display an image based on image data input from the image processing section 22.

The sound output section 25 includes a speaker 25*a* and the like, and outputs a sound based on sound data input from the sound processing section 23 from the speaker 25*a*.

The key operation section 26 includes a plurality of keys for allowing a user to input various instructions. When a user performs a depression operation of a key, the key operation section 26 outputs an input operation signal corresponding to the depressed key to the control section 27.

The control section 27 comprises a CPU 271, a memory section 272, a ROM 273, and the like.

The CPU 271 executes various programs stored in the ROM 273 according to an input signal input from each section of the sink equipment 200 and an input operation signal based on a depression operation of the various keys in the key operation section 26, and outputs an output signal to each section of the sink equipment 200 on the basis of an executed program. Thereby, the CPU 271 performs the integrated control of the whole operation of the sink equipment 200.

The memory section 272 includes a work area 2721 made of a volatile memory, such as a RAM, and stores a processing result produced at the time of the execution of various programs by the CPU 271, input data, and the like, in the work area 2721.

Moreover, the memory section 272 includes a data area 2722 made of a nonvolatile memory, such as an EPROM and the like.

The data area 2722 includes, for example, an EDID storage section 2722*a*, a corresponding image format storage section 2722*b*, and a set format storage section 2722*c*.

The EDID storage section 2722*a* stores the data pertaining to the image format by which the sink equipment 200 can perform a display.

The corresponding image format storage section 2722*b* stores the voltage values of the format signals transmitted and received through the hot plug line L3 and each format of image signals (numbers of effective scanning lines and scanning methods) associated with each of the voltage values, as shown in FIG. 4. The CPU 271 judges the format associated with the voltage value of a format signal transmitted from the source equipment 100 through the hot plug L3 as the format of the image signal transmitted from the source equipment 100 by referring to the corresponding image format storage section 2722*b* in the execution of a judging program 273*b*, which will be described below. For example, the corresponding image formats of 1080p, 720p, 1080i, 480p, and 480i are associated with the voltage values of 5 V, 4 V, 3 V, 2 V, and 1 V, respectively, in the corresponding image format storage section 2722*b* of FIG. 4.

The set format storage section 2722*c* stores image format information pertaining to the formats of image signals transmitted from the source equipment 100 in association with the equipment ID of the source equipment 100 as shown in FIG. 5. The CPU 271 stores the format of an image signal transmitted from the source equipment 100, which has been judged by the execution of the judgment program 273*b*, in association with the equipment ID of the equipment 100 in the execution of a setting program 273*c*, which will be described below.

The ROM 273 includes a program storage area made of, for example, a nonvolatile memory. To put it concretely, the ROM 273 stores the format signal reception program 273*a*, the judging program 273b, the setting program 273c, an EDID transmission program 273d, the image signal reception program 273e, and the like.

The format signal reception program 273a is a program to enable the CPU 271 to realize, for example, the function of receiving a format signal transmitted through the hot plug line L3 in the HDMI by the execution of the format signal transmission program 163a in the source equipment 100.

To put it concretely, the CPU 271 monitors the voltage value of the hot plug line L3 to supply a format signal indicating the connection of the source equipment 100 by a not-shown voltage detection circuit. When the voltage value of the hot plug line L3 is 0 V, then the CPU 271 judges that the HDMI cable C1 is not connected. Then, when the source equipment 100 is connected to the sink equipment 200 and a format signal is transmitted, the HDMI terminal 211 of the communication section 21 receives the format signal transmitted through the hot plug line L3. When the HDMI terminal 211 receives the format signal, the CPU 271 recognizes that the source equipment 100 has been connected. Furthermore, the CPU 271 can know the format of an image signal transmitted from the source equipment 100 by detecting the voltage value of the received format signal with a not-shown voltage detection circuit in the execution of the judging program 273b, which will be described below.

The CPU 271 functions as a reception section together with the HDMI terminal 211 by executing this format signal reception program 273a.

The judging program 273b is a program to enable the CPU 271 to realize, for example, the function of judging the format of an image signal on the basis of the voltage value of a format signal received by the execution of the format signal reception program 273a.

To put it concretely, when the format signal transmitted from the sink equipment 200 through the hot plug line L3 is received by the execution of the format signal reception program 273a, the CPU 271 makes the not-shown voltage detection circuit detect the voltage value of the received format signal. Then, the CPU 271 refers to the corresponding image format storage section 2722b to judge the format associated with the voltage value of the format signal as the format of the image signal transmitted from the source equipment 100 in the corresponding image format storage section 2722b.

For example, when the format signal transmitted from the source equipment 100 is 2 V in the example of the corresponding image format storage section 2722b of FIG. 4, then the CPU 271 judges that the format of the image signal transmitted from the source equipment 100 is 480p.

The CPU 271 functions as the judging section by the execution of this judging program 273b.

The setting program 273c is a program to enable the CPU 271 to realize, for example, the function of setting an image output on the basis of a judgment result by the execution of the judging program 273b.

To put it concretely, when the format of an image signal transmitted from the source equipment 100 is judged on the basis of the format signal transmitted from the source equipment 100 through the hot plug line L3 by the execution of the judging program 273b, the CPU 271 makes the set format storage section 2722c store the information pertaining to the format in association with the equipment ID of the source equipment 100, and performs the setting processing of an image output in the image processing section 22 on the basis of the format. Then, when the setting processing in the image processing section 22 ends, the CPU 271 releases the image muting in a not-shown muting circuit.

The CPU 271 functions as a setting section by executing this setting program 273c.

The EDID transmission program 273d is a program to enable the CPU 271 to realize, for example, the function of transmitting EDID to the source equipment 100 through the HDMI.

To put it concretely, when the setting processing in the image processing section 22 starts by the execution of the setting program 273c, the CPU 271 obtains the EDID pertaining to the image format by which the sink equipment 200 can perform a display, the EDID being stored in the EDID storage section 2722a, from the EDID storage section 2722a, and transmits the EDID to the source equipment 100 through the DDC line L2 of the HDMI cable C1.

Incidentally, the timing at which the EDID is transmitted to the source equipment 100 is not limited to the timing after the start of the setting processing in the image processing section 22. For example, the EDID may be transmitted immediately after the recognition of the source equipment 100 on the basis of the format signal transmitted through the hot plug line L3.

The image signal reception program 273e is a program to enable the CPU 271 to realize, for example, the function of receiving an image signal transmitted through the HDMI cable C1 at the HDMI terminal 211 of the communication section 21 by the execution of the image signal transmission program 163c in the source equipment 100.

To put it concretely, the CPU 271 receives the image signal transmitted through the TMDS line L1 of the HDMI cable C1 at the HDMI terminal 211 of the communication section 21. When the CPU 271 has received the image signal, the CPU 271 outputs the received image signal to the image processing section 22 to perform predetermined image processing in the image processing section 22, and the CPU 271 outputs the processed image signal to the display section 24.

Now, in parallel with the confirmation processing of the EDID performed between the source equipment 100 and the sink equipment 200, the setting processing of the image output by the image processing section 22 is being performed on the side of the sink equipment 200. Consequently, at the time point when the sink equipment 200 receives the image signal transmitted from the source equipment 100 through the TMDS line L1 by the execution of the image signal reception program 273e, the setting processing of the image output in the image processing section 22 in the sink equipment 200 has already been ended. That is, in the sink equipment 200, an image can be displayed on the display 24a without delay after the reception of the image signal transmitted from the source equipment 100.

Figure 6:
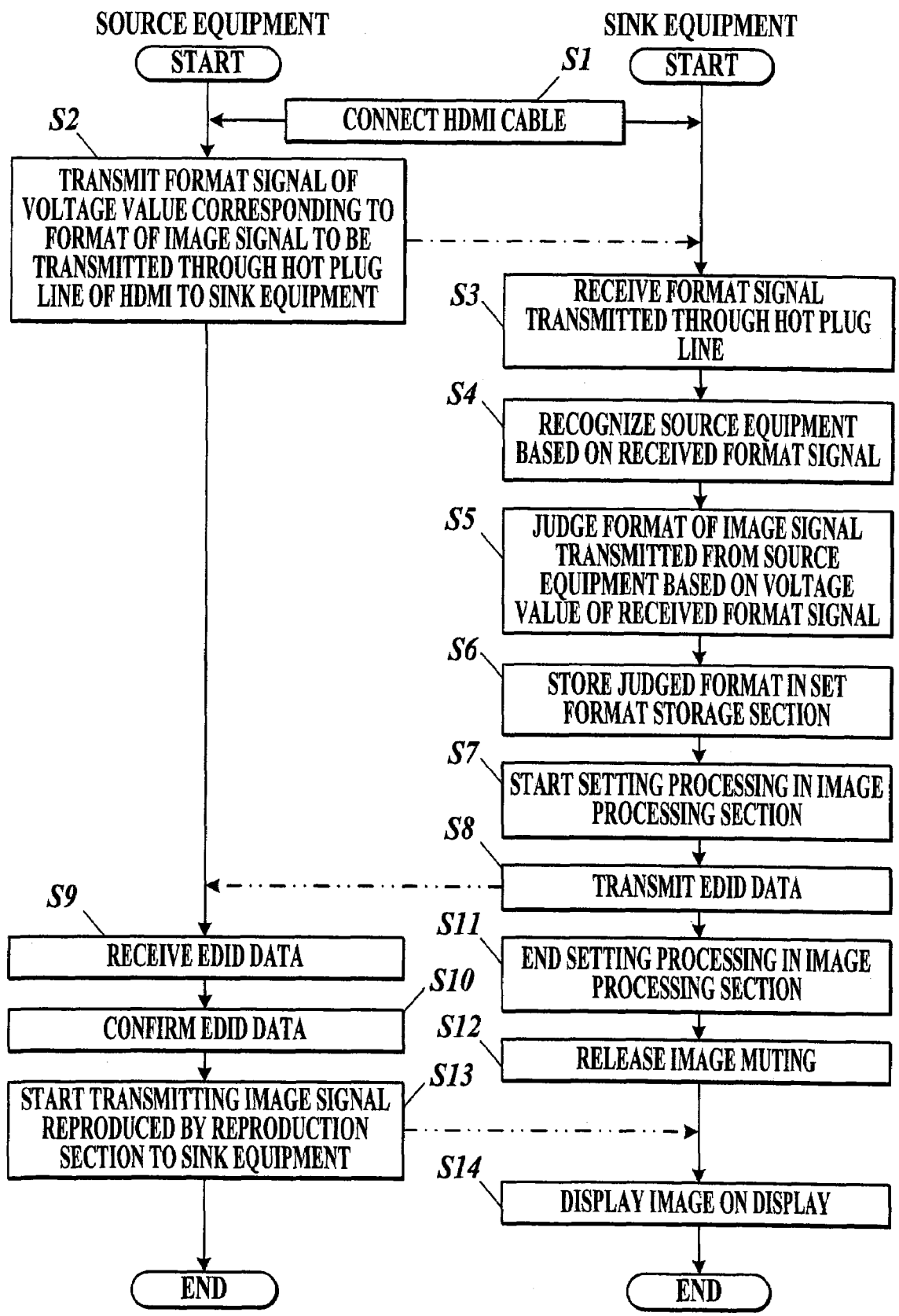
FIG. 6 is a flowchart showing the image transmission and reception processing performed in the signal input system of the first embodiment.

Next, the image transmission and reception processing performed between the source equipment 100 and the sink equipment 200 is described with reference to the flowchart of FIG. 6.

At Step S1, the source equipment 100 and the sink equipment 200 are first connected to each other with the HDMI cable C1. Then, at Step S2, the CPU 161 of the source equipment 100 shows the connection between the source equipment 100 and the sink equipment 200, and transmits the format signal of the voltage value corresponding to the format of the image signal transmitted from the source equipment 100, to the sink equipment 200 through the hot plug line L3 of the HDMI cable C1 by the HDMI terminal 141 of the communication section 14.

At Step S3, when the CPU 271 of the sink equipment 200 receives the format signal transmitted through the hot plug line L3 of the HDMI cable C1 with the HDMI terminal 211 of the communication section 21, the CPU 271 recognizes the connection of the source equipment 100 on the basis of the received format signal at Step S4. Then, at Step S5, the CPU 271 makes the voltage detection circuit (not shown) detect the voltage value of the received format signal, and judges the format of the image signal transmitted from the source equipment 100 on the basis of the detected voltage value. At Step S6, the CPU 271 stores and sets the format judged as the format of the image signal transmitted from the source equipment 100 into the set format storage section 2722c. Then, at Step S7, the CPU 271 starts the setting processing of the image output in the image processing section 22 on the basis of the set format. Moreover, when the CPU 271 starts the setting processing in the image processing section 22, the CPU 271 transmits the EDID pertaining to the format of the corresponding image signal of the sink equipment 200 to the sink equipment 200 through the DDC line L2 of the HDMI cable C1 on the basis of the EDID stored in the EDID storage section 2722a at Step S8.

At Step S9, when the CPU 161 of the source equipment 100 receives the EDID transmitted through the DDC line L2 of the HDMI cable C1 with the HDMI terminal 141 provided in the communication section 14, the CPU 161 performs the confirmation processing to judge whether the sink equipment 200 can deal with the format of the image signal to be transmitted or not on the basis of the received EDID at Step S10.

While the confirmation of the EDID is being performed in the source equipment 100, the CPU 271 of the sink equipment 200 ends the setting processing of the image output in the image processing section 22 at Step S11 after the transmission of the EDID, and releases the image muting in the not-shown muting circuit at Step S12.

Then, at Step S13, the CPU 161 of the source equipment 100 performs the processing of converting the format of the image signal reproduced in the reproduction section 11 and decoded in the decoder section 12 into the format of the image signal that the sink equipment 200 can display, in the format conversion section 13, and transmits the processed image signal to the sink equipment 200 through the TMDS line L1 of the HDMI cable C1 to end the present processing. Then, at Step S14, the CPU 271 of the sink equipment 200 receives the image signal transmitted from the source equipment 100 with the HDMI terminal 211 of the communication section 21, and makes the display 24a display the image based on the received image signal to end the present processing.

According to the signal input system A of the first embodiment described above, in the source equipment 100, the format signal of the voltage value corresponding to the format of an image signal is transmitted to the sink equipment 200 through the hot plug line L3 in the HDMI cable C1 by the execution of the format signal transmission program 163a by the CPU 161. Moreover, in the sink equipment 200, the format signal transmitted through the hot plug line L3 by the execution of the format signal transmission program 163a is received by the execution of the format signal reception program 273a by the CPU 271; the format of the image signal is judged on the basis of the voltage value of the format signal received by the execution of the format signal reception program 273a, by the execution of the judging program 273b; and the setting of an image output is executed on the basis of a judgment result by the execution of the judging program 273b, by the execution of the setting program 273c. Furthermore, the hot plug line L3 is a line to perform the transmission and the reception of a hot plug signal indicating the connection of the source equipment 100 and the sink equipment 200 to each other, and the format signal has the function of a hot plug signal.

Consequently, when the source equipment 100 and the sink equipment 200 are connected to each other, the format signal of a voltage value, which indicates the connection of both the pieces of equipment 100 and 200 and corresponds to the format of an image signal, is transmitted from the source equipment 100 to the sink equipment 200 through the hot plug line L3. Consequently, in the signal input system A, in which the source equipment 100 and the sink equipment 200 are mutually connected with the HDMI, the setting of an image output of the sink equipment 200 is enabled to start at the timing after the mutual connection of both the pieces of equipment, and the time up to the image output after the mutual connection of both the pieces of equipment can be shortened.

Second Embodiment

Figure 7:
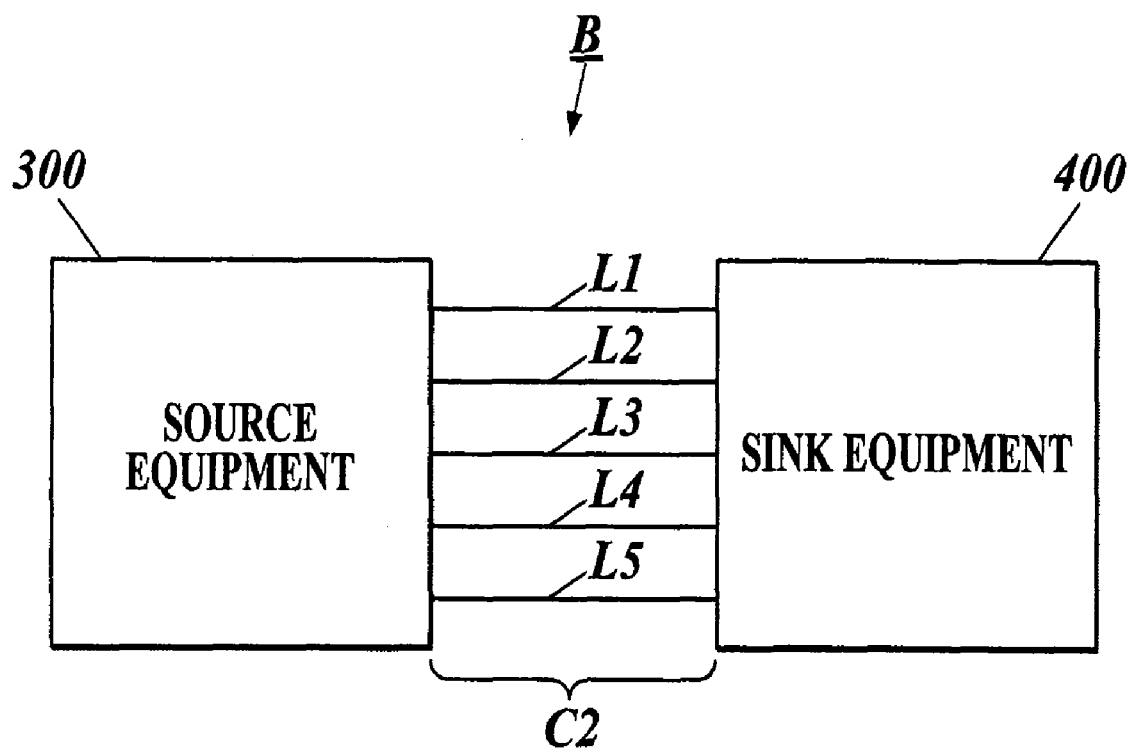
FIG. 7 is a block diagram to illustrate the whole configuration of the signal input system of a second embodiment.

The whole configuration of a signal input system B of a second embodiment is next described with reference to FIG. 7. Incidentally, the same parts as those of the signal input system A of the first embodiment are denoted by the same reference marks and their descriptions are omitted.

In the signal input system B of the present second embodiment, a piece of source equipment 300 and a piece of sink equipment 400 are connected to each other with a HDMI cable C2 based on the HDMI standard, and an image signal and a sound signal are transmitted from the source equipment 300 to the sink equipment 400.

The HDMI cable C2 comprises, for example, a TMDS line L1 for transmitting an image signal and a sound signal in the TMDS format, a DDC line L2 for transmitting and receiving EDID, a hot plug line L3 (first line) for detecting the connection of the source equipment 300 and the sink equipment 400 with each other, a first sound format line L4 (second line), and a second sound format line L5 (second line). Incidentally, the hot plug line L3 is assigned to, for example, a $19^{th}$ pin in each of the pin arrangements of HDMI terminals 341 and 411. Moreover, the first sound format line L4 is assigned to, for example, a $14^{th}$ pin. Furthermore, the second sound format line L5 is configured to be assigned to, for example, a $20^{th}$ pin by newly providing the $20^{th}$ pin.

The hot plug line L3 is configured to connect both the control sections 36 and 47 of the source equipment 300 and the sink equipment 400 (see FIGS. 8 and 9), respectively, with each other similarly to the first embodiment so that the transmission and the reception of a signal can be performed between the control sections 36 and 47 of both the pieces of equipment 300 and 400, respectively, at the fastest speed when both the pieces of equipment 300 and 400 are connected to each other. Then, the signal input system B makes the voltage value of a signal transmitted through the hot plug line L3 changeable according to the format of an image signal transmitted from the side of the source equipment 300 to the side of the sink equipment 400, and uses the voltage value as an image format signal (first format signal) to indicate the fact of the connection of both the pieces of equipment 300 and 400 with each other and to indicate the format of the transmitted image signal. Thereby the signal input system B realizes the shortening of the time from the judgment of cable connection to an image output.

Furthermore, the signal input system B of the present second embodiment, similarly to the hot plug line L3, configures the first sound format line L4 and the second sound format line L5 as the lines to connect the control sections 36 and 47 of the source equipment 300 and the sink equipment 400, respectively, with each other to perform the transmission and the reception of signals at the fastest speeds at the time of the connection of both the pieces of equipment 300 and 400 with each other. Then, the signal input system B realizes the shortening of the time up to a sound output after the judgment of the cable connection in addition to the image output, by transmitting the sound format signal (second format signal) from the source equipment 300 to the sink equipment 400 through the first sound format line L4 and the second sound format line L5, and by making the sound format signal variable according to the voltage value corresponding to the format of a sound signal transmitted from the side of the source equipment 300.

Moreover, the description of the signal input system B of the present second embodiment is performed, similarly to the signal input system A of the first embodiment, as that the formats of the image signal indicated by image format signals to be transmitted and received through the hot plug line L3 concern the number of scanning lines (number of effective scanning lines) of the image signal and the scanning method thereof (that is, interlace/progressive scans). However, the formats of the image signals indicated by image format signals may not be limited to those ones.

Moreover, in the signal input system B of the present second embodiment, descriptions are given on the suppositions that the format of a sound signal indicated by a sound format signal transmitted and received through the first sound format line L4 is an audio type one, such as pulse code modulation (PCM), and that the format of a sound signal indicated by a sound format signal transmitted and received through the second sound format line L5 is a sampling frequency. However, the formats of the sound signals indicated by the sound format signals may not be limited to the above ones. For example, when the audio type is MPEG1 Audio Layer 3 (MP 3), then a bit rate may be assigned to the sound format transmitted through the second sound format line L5 in place of the sampling frequency.

Moreover, the kinds of the lines through which the image format signal and the sound format signal are transmitted are not also limited to the hot plug line L3, and the first and second sound format lines L4 and L5, but the image format signal and the sound format signal may be transmitted by using the different number lines according to the content of the image format signal and the sound format signal to be transmitted.

(Configuration of Source Equipment)

Figure 8:
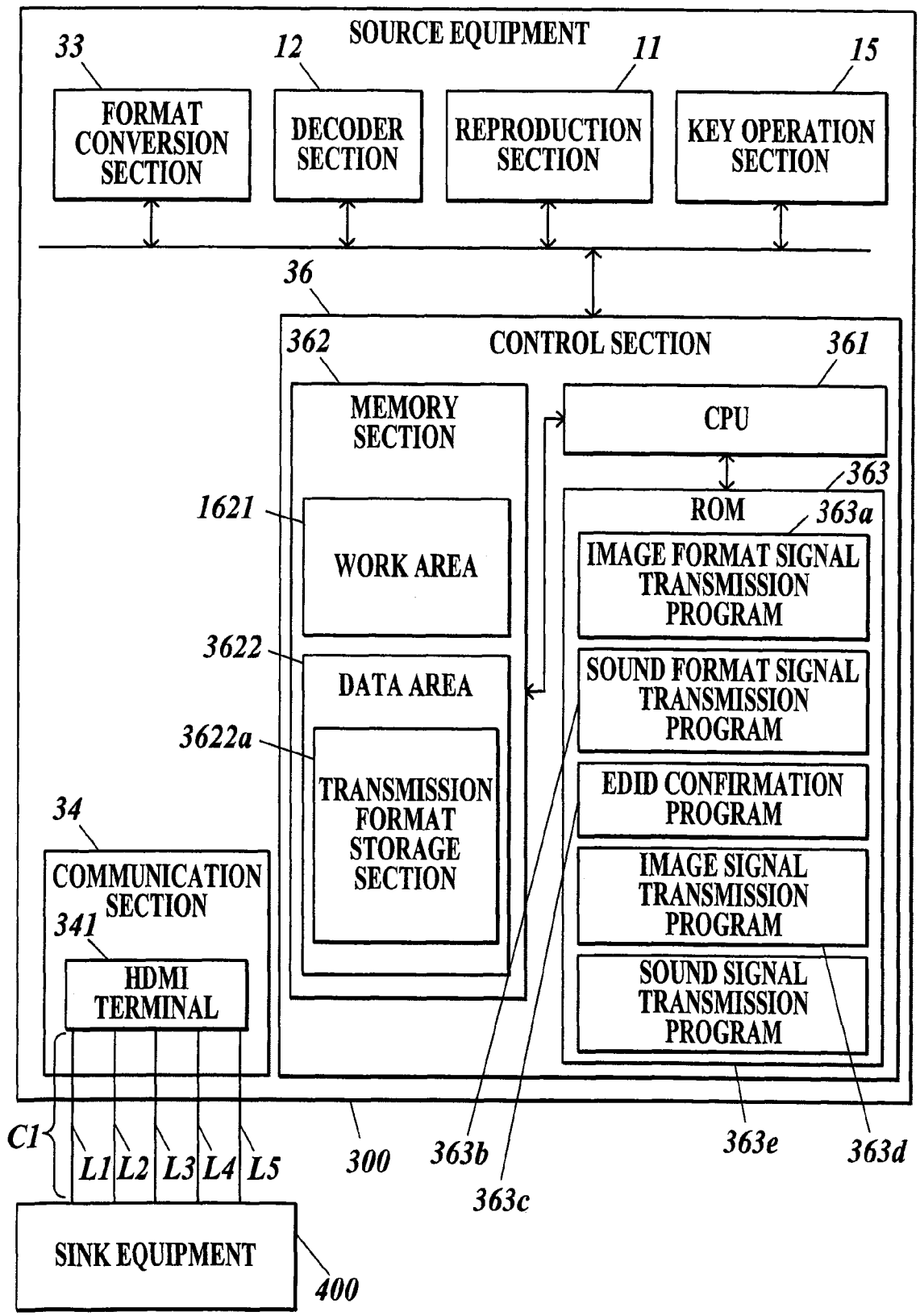
FIG. 8 is a block diagram to illustrate the configuration of the principal part of the source equipment constituting the signal input system of the second embodiment.

Next, the configuration of the source equipment 300 will be described with reference to FIG. 8. The source equipment 300 is a reproduction apparatus such as a DVD player, and is connected to the sink equipment 400 with the HDMI cable C2. The source equipment 300 reproduces the image signal and the like recorded in a DVD, and transmits the reproduced image signal to the sink equipment 400.

The source equipment 300 comprises, for example, the reproduction section 11 to read image data recorded on a not-shown DVD, the decoder section 12 to perform predetermined decoding processing to the image data read by the reproduction section 11, a format conversion section 33 to convert the image format of the image data output from the decoder section 12 into a predetermined image format in accordance with an instruction of the control section 36, a communication section 34 to transmit the image data input from the format conversion section 33 to external equipment, such as the sink equipment 400, the key operation section 15 to enable a user to input various instructions, the control section 36 to perform the integrated control of each section of the source equipment 300, and the like.

The format conversion section 33 converts the image signal output form the decoder section 12 into the format that is stored in a transmission format storage section 3622a to output the converted image signal to the communication section 34 under the control of the control section 36 in the execution of an image signal transmission program 363d, which will be described later. Moreover, format conversion section 33 converts the format of the sound signal output from the decoder section 12 into the format of the sound stored in the transmission format storage section 3622a to output the converted sound signal to the communication section 34 in accordance with the control of the control section 36 in the execution of the sound signal transmission program 363e, which will be described below.

The communication section 34 is equipped with an HDMI terminal 341 based on the HDMI standard, and performs the transmission of various signals, such as an image signal and a control signal, with the sink equipment 400 through the HDMI cable C2 connecting the HDMI terminal 341 with an HDMI terminal 411 (described below) provided in the sink equipment 400.

To put it concretely, the communication section 34 transmits an image format signal, indicating the connection state of the sink equipment 400 and the source equipment 300 and the format of an image signal to be transmitted, to the side of the sink equipment 400 through the hot plug line L3 of the HDMI cable C2 in the execution of an image format signal transmission program 363a to be described below. Moreover, the communication section 34 transmits a sound format signal indicating the format of a sound signal to be transmitted to the side of the sink equipment 400 through the first sound format line L4 and the second sound format line L5 of the HDMI cable C2 in the execution of a sound format signal transmission program 363b to be described below.

Moreover, the communication section 34 transmits the image signal and the sound signal that have been reproduced in the reproduction section 11 to the sink equipment 400 through the TMDS line L1 of the HDMI cable C2 in the execution of the image signal transmission program 363d and the sound signal transmission program 363e, which will be described below.

The control section 36 comprises a CPU 361, a memory section 362, a ROM 363, and the like.

The CPU 361 executes various programs stored in the ROM 363 according to an input signal input from each section of the source equipment 300, input operation signal based on an depression operation of various keys in the key operation section 15, and the like, and outputs an output signal to each section of the source equipment 300 on the basis of the executed program to perform the integrated control of the whole operation of the source equipment 300.

The memory section 362 includes a data area 3622 made of a nonvolatile memory, such as an erasable programmable ROM (EPROM). The data area 3622 is provided with, for example, the transmission format storage section 3622a.

The transmission format storage section 3622a stores the format of an image signal and a sound signal to be transmitted to the sink equipment 400, and the formats of the image signal and the sound signal are converted into the formats based on the ones stored in the transmission format storage section 3622a. Then the converted image signal and the sound signal are transmitted.

The ROM 363 includes a program storage area made of, for example, a nonvolatile memory, and, to put it concretely, stores the image format signal transmission program 363a, the sound format signal transmission program 363b, an EDID confirmation program 363c, the image signal transmission program 363d, the sound signal transmission program 363e, and the like.

The image format signal transmission program 363a is a program to enable the CPU 361 to realize, for example, the function of transmitting the image format signal of the voltage value corresponding to the format of an image signal to the sink equipment 400 through the hot plug line L3 in the HDMI.

To put it concretely, the CPU 361 monitors the voltage value of the hot plug line L3, through which the image format signal indicating the connection of the sink equipment 400 is supplied, with a not-shown voltage detection circuit, and generates an image format signal of the voltage value corresponding to the format of the image signal to be transmitted to the sink equipment 400 on the basis of the transmission format storage section 3622a. Then, when the source equipment 300 and the sink equipment 400 are connected to each other with the HDMI cable C2, then the generated image format signal is transmitted from the HDMI terminal 341 of the communication section 34 to the sink equipment 400 through the hot plug line L3 of the HDMI cable C2. The image format signal functions to indicate the connection of the source equipment 300 to the sink equipment 400, and functions to inform the side of the sink equipment 400 of the format of the image signal to be transmitted from the source equipment 300 to the sink equipment 400.

The CPU 361 functions as a first transmission section together with the HDMI terminal 341 by executing this image format signal transmission program.

The sound format signal transmission program 363b is a program to enable the CPU 361 to realize, for example, the function of transmitting the sound format signal of the voltage value corresponding to the format of a sound signal to the sink equipment 400 through the first sound format line L4 and the second sound format line L5 in the HDMI.

To put it concretely, the CPU 361 generates the sound format signal of the voltage value corresponding to the sound signal to be transmitted to the sink equipment 400 on the basis of the transmission format storage section 3622a. Then, when the source equipment 300 and the sink equipment 400 are connected to each other with the HDMI cable C2, then the generated sound format signal is transmitted from the HDMI terminal 341 of the communication section 34 to the sink equipment 400 through the first sound format line L4 and the second sound format line L5 of the HDMI cable C2. The sound format signal performs the function of informing the side of the sink equipment 400 of the format of a sound signal transmitted from the source equipment 300 to the sink equipment 400. For example, the CPU 361 transmits a sound format signal indicating the audio type of a sound signal through the first sound format line L4. Then, when the audio type is the PCM or the like and the specification of sampling frequency is necessary, then the sound format signal indicating the sampling frequency of the sound signal is transmitted through the second sound format line L5.

The CPU 361 functions as a second transmission section together with the HDMI terminal 341 by executing this sound format signal transmission program.

The EDID confirmation program 363c is a program to enable the CPU 361 to realize, for example, the function of receiving EDID transmitted from the sink equipment 400 though the HDMI to confirm the formats of an image signal and a sound signal to be transmitted.

To put it concretely, when the EDID, which is the data pertaining to an image format that the sink equipment 400 can display and the data pertaining to the sound format capable of being output, is transmitted from the sink equipment 400 through the DDC line L2 of the HDMI cable C2, the CPU 361 receives the EDID through the HDMI terminal 341 of the communication section 34, and judges whether the sink equipment 400 can deal with the formats of the image signal and the sound signal to be transmitted from the side of the source equipment 300 or not on the basis of the received EDID.

The image signal transmission program 363d is a program to enable the CPU 361 to realize, for example, the function of transmitting an image signal from the HDMI terminal 341 of the communication section 34 to the sink equipment 400 through the HDMI cable C2.

To put it concretely, the CPU 361 judges whether the sink equipment 400 can deal with the format of an image signal to be transmitted or not on the basis of the EDID transmitted from the sink equipment 400 in the execution of the EDID confirmation program 363c. When the CPU 361 judges that the sink equipment 400 can deal with the format of the image data to be transmitted, then the CPU 361 makes the format conversion section 33 convert the format of the image signal reproduced by the reproduction section 11 into the format stored in the transmission format storage section 3622a, and transmits the converted image signal to the sink equipment 400 through the TMDS line L1 of the HDMI cable C2. Moreover, when the CPU 361 judges that the sink equipment 400 cannot deal with the format of the image signal to be transmitted, then the CPU 361 makes the format conversion section 33 convert the image signal reproduced by the reproduction section 11 to a subordinate format than the format stored in the transmission format storage section 3622a on the basis of the received EDID, and transmits the converted image signal to the sink equipment 400 through the TMDS line L1 of the HDMI cable C2.

The sound signal transmission program 363e is a program to enable the CPU 361 to realize, for example, the function of transmitting a sound single from the HDMI terminal 341 of the communication section 34 to the sink equipment 400 through the HDMI cable C2.

To put it concretely, the CPU 361 judges whether the sink equipment 400 can deal with the format of a sound signal to be transmitted or not on the basis of the EDID transmitted from the sink equipment 400 in the execution of the EDID confirmation program 363c. When the CPU 361 judges that the sink equipment 400 can deal with the format of the sound signal to be transmitted, then the CPU 361 converts the format of the sound signal reproduced by the reproduction section 11 into the format stored in the transmission format storage section 3622a based on the received EDID with the format conversion section 33, and transmits the converted sound signal to the sink equipment 400 through the TMDS line L1 of the HDMI cable C2. Moreover, when the CPU 361 judges that the sink equipment 400 cannot deal with the format of the sound signal to be transmitted, then the CPU 361 converts the format of the sound signal reproduced by the reproduction section 11 into a subordinate format than the format stored in the transmission format storage section 3622a with the format conversion section 33, and transmits the converted sound signal to the sink equipment 400 by the TMDS line L1 of the HDMI cable C2.

(Configuration of Sink Equipment)

Figure 9:
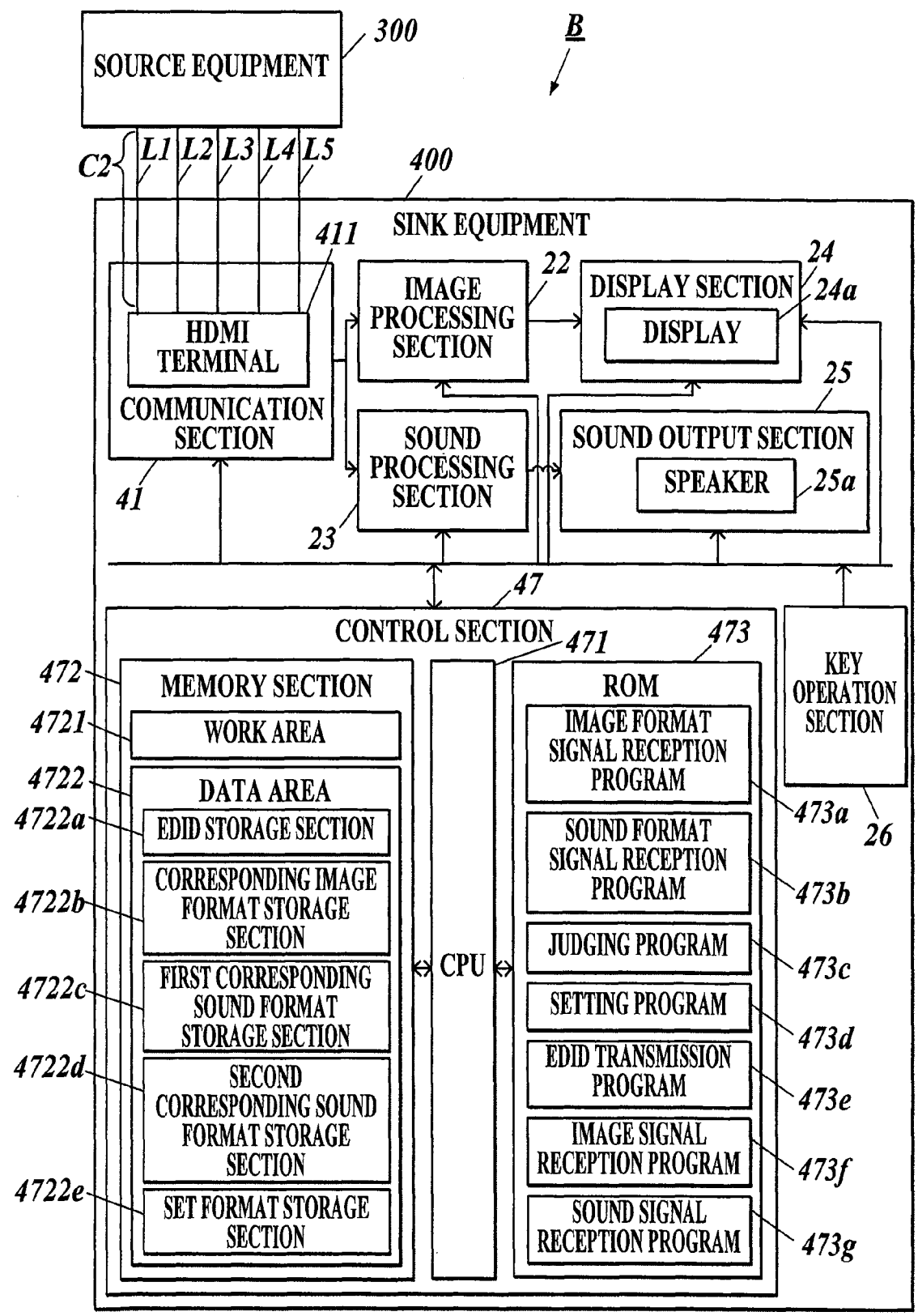
FIG. 9 is a block diagram to illustrate the configuration of the principal part of the sink equipment constituting the signal input system of the second embodiment.

Next, the configuration of the sink equipment 400 is described with reference to FIG. 9. The sink equipment 400 is a display apparatus, such as a television receiver, and is connected to the source equipment 300 with the HDMI cable C2. Then, the sink equipment 400 makes a display 24a display an image on the basis of an image signal input from the source equipment 300, and outputs a sound on the basis of the sound signal input from the source equipment 300.

The sink equipment 400 comprises a communication section 41 to transmit various signals such as an image signal and a control signal to external equipment such as the source equipment 300, the image processing section 22 to perform predetermined image processing to an image signal, the sound processing section 23 to perform predetermined sound processing to a sound signal, the display section 24 to display an image on the basis of image data input from the image processing section 22, the sound output section 25 to output a sound on the basis of sound data input from the sound processing section 23, the key operation section 26 to enable a user to input various instructions, the control section 47 to perform the integrated control of each section of the sink equipment 400, and the like.

The communication section 41 includes the HDMI terminal 411 based on the HDMI standard, and transmits various signals such as an image signal and a control signal to the source equipment 300 through the HDMI cable C2 connecting the HDMI terminal 411 with the HDMI terminal 341 provided in the source equipment 300.

To put it concretely, the communication section 41 receives an image format signal transmitted from the source equipment 300 through the hot plug line L3 of the HDMI cable C2 in the execution of an image format signal reception program 473a, which will be described below.

Moreover, the communication section 41 receives a sound format signal transmitted from the source equipment 300 through the first sound format line L4 and the second sound format line L5 of the HDMI cable C2 in the execution of a sound format signal reception program 473b, which will be described below.

Moreover, the communication section 41 receives an image signal and a sound signal transmitted from the source equipment 400 through the TMDS line L1 of the HDMI cable C2 in the execution of an image signal reception program 473f and a sound signal reception program 473g, which will be described below.

The control section 47 comprises a CPU 471, a memory section 472, a ROM 473, and the like.

The CPU 471 executes various programs stored in the ROM 473 according to an input signal input from each section of the sink equipment 400 and an input operation signal based on a depression operation of the various keys in the key operation section 26, and outputs an output signal to each section of the sink equipment 400 on the basis of an executed program. Thereby, the CPU 471 performs the integrated control of the whole operation of the sink equipment 400.

The memory section 272 includes a data area 4722 made of a nonvolatile memory, such as an EPROM and the like. The data area 4722 includes, for example, an EDID storage section 4722a, a corresponding image format storage section 4722b, a first corresponding sound format storage section 4722c, a second corresponding sound format storage section 4722d, and a set format storage section 4722e.

The EDID storage section 4722a stores the data pertaining to the image format by which the sink equipment 400 can perform a display and the sound format by which the sink equipment 400 can perform an output.

The corresponding image format storage section 4722b stores the voltage values of the image format signals transmitted and received through the hot plug line L3 and each format of image signals (numbers of effective scanning lines and scanning methods) associated with each of the voltage values, as shown in FIG. 4. The CPU 471 judges the format associated with the voltage value of an image format signal transmitted from the source equipment 300 through the hot plug L3 as the format of the image signal transmitted from the source equipment 300 by referring to the corresponding image format storage section 4722b in the execution of a judging program 473c, which will be described below.

The first corresponding sound format storage section 4722c stores the voltage values of sound format signals transmitted and received through the first sound format line L4 and each format (audio type) of sound signals in association with each other as shown in FIG. 10. The CPU 471 refers to the corresponding sound format storage section 4722c to judge the format of the audio type associated with the voltage value of the sound format signal transmitted from the source equipment 300 through the first sound format line L4 as the format of the audio type of the sound signal transmitted from the sound equipment 300 in the execution of the judging program 473c, which will be described below.

The second corresponding sound format storage section 4722d stores the voltage values of the sound format signals transmitted and received through the second sound format line L5 and each format (sampling frequency) of sound signals in association with each other as shown in FIG. 11. The CPU 471 refers to the second corresponding sound format storage section 4722d to judge the format of the sampling frequency associated with the voltage value of the sound format signal transmitted from the source equipment 300 through the second sound format line L5 of a sound signal transmitted from the source equipment 300 as the format of the sampling frequency of the sound signal transmitted from the source equipment 300 in the execution of the judging program 473c, which will be described below.

The set format storage section 4722e stores image format information pertaining to the formats of image signals transmitted from the source equipment 300 in association with the equipment ID of the source equipment 300 as shown in FIG. 12. The CPU 471 stores the format of an image signal transmitted from the source equipment 300, which has been judged by the execution of the judgment program 473c, in association with the equipment ID of the equipment 300 in the execution of a setting program 473d, which will be described below.

The ROM 473 includes a program storage area made of, for example, a nonvolatile memory. To put it concretely, the ROM 473 stores the image format signal reception program 473a, the sound format signal reception program 473b, the judging program 473c, the setting program 473d, an EDID transmission program 473e, the image signal reception program 473f, the sound signal reception program 473g, and the like.

The image format signal reception program 473a is a program to enable the CPU 471 to realize, for example, the function of receiving an image format signal transmitted through the hot plug line L3 in the HDMI by the execution of the image format signal transmission program 363a in the source equipment 300.

To put it concretely, the CPU 471 monitors the voltage value of the hot plug line L3 to supply an image format signal indicating the connection of the source equipment 300 with a not-shown voltage detection circuit. When the voltage value of the hot plug line L3 is 0 V, then the CPU 471 judges that the HDMI cable C2 is not connected. Then, when the source equipment 300 is connected to the sink equipment 400 and an image format signal is transmitted, the HDMI terminal 411 of the communication section 41 receives the image format signal transmitted through the hot plug line L3. When the HDMI terminal 411 receives the image format signal, the CPU 471 recognizes that the source equipment 300 has been connected. Furthermore, the CPU 471 can know the format of an image signal transmitted from the source equipment 300 by detecting the voltage value of the received image format signal in the execution of the judging program 473c, which will be described below.

The CPU 471 functions as a first reception section together with the HDMI terminal 411 by executing this image format signal reception program.

The sound format signal reception program 473b is a program to enable the CPU 471 to realize, for example, the function of receiving a sound format signal transmitted through the first sound format line L4 and the second sound format line L5 of the HDMI by the execution of the sound format signal transmission program 363b in the source equipment 300.

To put it concretely, the CPU 471 receives the image format signal in the HDMI terminal 411 by the execution of the above-mentioned image format signal reception program 473a to recognize the connection of the source equipment 300. Then, the CPU 471 receives the sound format signal indicating the audio type, which is transmitted through the first sound format line L4 of the HDMI cable C2, with the HDMI terminal 411 of the communication section 41. Moreover, the CPU 471 receives the sound format signal indicating the sampling frequency, which is transmitted through the second sound format line L5 of the HDMI cable C2, with the HDMI terminal 411 of the communication section 41. Then, the CPU 471 can know the format of the sound signal transmitted from the source equipment 300 by detecting the voltage value of the received sound format signal with the not-shown voltage detection circuit in the execution of the judging program 473c, which will be described below.

The CPU 471 functions as a second reception section together with the HDMI terminal 411 by executing this format signal reception program.

The judging program 473c is a program to enable the CPU 471 to realize, for example, the function of judging the formats of an image signal and a sound signal on the basis of the voltage values of an image format signal and a sound format signal received by the execution of the image format signal reception program 473a and the sound format signal reception program 473b.

To put it concretely, when the image format signal transmitted from the sink equipment 400 through the hot plug line L3 is received by the execution of the image format signal reception program 473a, the CPU 471 makes the not-shown voltage detection circuit detect the voltage value of the received image format signal. Then, the CPU 471 refers to the corresponding image format storage section 4722b to judge the format associated with the voltage value of the image format signal as the format of the image signal transmitted from the source equipment 300 in the corresponding image format storage section 4722b.

Moreover, when the CPU 471 receives the sound format signal transmitted from the sink equipment 400 through the first sound format line L4 and the second sound format line L5 by the execution of the sound format signal reception program 473b, the CPU 471 detects the voltage value of each of the sound format signals received through each of the lines L4 and L5 with the not-shown voltage detection circuit. Then, the CPU 471 refers to the first corresponding sound format storage section 4722c and the second corresponding sound format storage section 4722d to judge the format associated with the voltage value of the sound format signal in the first corresponding sound format storage section 4722c and the second corresponding sound format storage section 4722d as the format of the sound signal transmitted from the source equipment 300.

For example, in the example of the first corresponding sound format storage section 4722c of FIG. 10, when the sound format signal transmitted from the source equipment 300 is 5 V, the CPU 471 judges that the format of the audio type of the sound signal transmitted from the source equipment 300 is the PCM. Moreover, for example, in the example of the second corresponding sound format storage section 4722d of FIG. 11, when the sound format signal transmitted from the source equipment 300 is 4 V, the CPU 471 judges that the format of the sampling frequency of the sound signal transmitted from the source equipment 300 is 48 kHz.

The CPU 471 functions as a first judging section and a second judging section by executing this judging program 473c.

The setting program 473d is a program to enable the CPU 471 to realize, for example, the function of setting an image output and a sound output on the basis of a judgment result by the execution of the judging program 473c.

To put it concretely, when the format of an image signal transmitted from the source equipment 300 is judged on the basis of the image format signal transmitted from the source equipment 300 through the hot plug line L3, and when the format of a sound signal transmitted from the source equipment 300 on the basis of the sound format signal transmitted from the source equipment 300 through the first sound format line L4 and second sound format line L5 by the execution of the judging program 473c, the CPU 471 makes the set format storage section 4722e store the information pertaining to the formats of the image and the sound in association with the equipment ID of the source equipment 300. Then, the CPU 471 performs the setting processing of an image output in the image processing section 22 and the setting processing of a sound output in the sound processing section 23 on the basis of the formats of the image and the sound. Then, when the setting processing in the image processing section 22 or the sound output section 25 ends, the CPU 471 releases the image muting and the sound muting in a not-shown muting circuit.

The CPU 471 functions as a first setting section and a second setting section by executing this setting program 473d.

The EDID transmission program 473e is a program to enable the CPU 471 to realize, for example, the function of transmitting EDID to the source equipment 300 through the HDMI.

To put it concretely, when the setting processing in the image processing section 22 and the setting processing in the sound processing section 23 start by the execution of the setting program 473d, the CPU 471 obtains the EDID pertaining to the image format by which the sink equipment 400 can perform a display and the sound format, which EDID is stored in the EDID storage section 4722a, from the EDID storage section 4722a, and transmits the EDID to the source equipment 300 through the DDC line L2 of the HDMI cable C2.

Incidentally, the timing at which the EDID is transmitted to the source equipment 300 is not limited to the timing after the start of the setting processing in the image processing section 22 and the sound processing section 23. For example, the EDID may be transmitted immediately after the recognition of the source equipment 300 on the basis of the image format signal transmitted through the hot plug line L3.

The image signal reception program 473f is a program to enable the CPU 471 to realize, for example, the function of receiving an image signal transmitted through the HDMI cable C2 at the HDMI terminal 411 of the communication section 41 by the execution of the image signal transmission program 363d in the source equipment 300.

To put it concretely, the CPU 471 receives the image signal transmitted through the TMDS line L1 of the HDMI cable C2 at the HDMI terminal 411 of the communication section 41. When the CPU 471 has received the image signal, the CPU 471 outputs the received image signal to the image processing section 22 to perform predetermined image processing in the image processing section 22, and the image processing section 22 outputs the processed image signal to the display section 24.

The sound signal reception program 473g is a program to enable the CPU 471 to realize, for example, the function of receiving the sound signal transmitted through the HDMI cable C2 with the HDMI terminal 411 of the communication section 41 by the execution of the sound signal transmission program 363e in the source equipment 300.

To put it concretely, the CPU 471 receives the sound signal transmitted through the TMDS line L1 of the HDMI cable C2 with the HDMI terminal 411 of the communication section 41. When the CPU 471 receives the sound signal, the CPU 471 outputs the received sound signal to the sound processing section 23, and the sound processing section 23 performs the predetermined sound processing of the sound data to output the processed sound data to the display section 24.

Now, in parallel with the confirmation processing of the EDID performed between the source equipment 300 and the sink equipment 400, the setting processing of the image output by the image processing section 22 and the setting processing of the sound output in the sound processing section 23 are being performed on the side of the sink equipment 400. Consequently, at the time point when the sink equipment 400 receives the image signal and the sound signal transmitted from the source equipment 300 through the TMDS line L1 by the execution of the image signal reception program 473f and the sound signal reception program 473g, the setting processing of the image output in the image processing section 22 and the setting processing of the sound output in the sound processing section 23 in the sink equipment 400 have already been ended. That is, in the sink equipment 400, an image can be displayed on the display 24a and a sound can be output from the sound output section 25 without delay after the reception of the image signal and the sound signal transmitted from the source equipment 300.

Next, image and sound transmission and reception processing performed between the source equipment 300 and the sink equipment 400 is described with reference to the flowchart of FIG. 13.

At Step T11, the source equipment 300 and the sink equipment 400 are first connected to each other with the HDMI cable C2. Then, at Step T12, the CPU 361 of the source equipment 300 shows the connection between the source equipment 300 and the sink equipment 400, and transmits the image format signal of the voltage value corresponding to the format of the image signal transmitted from the source equipment 300 to the sink equipment 400 through the hot plug line L3 of the HDMI cable C2 by the HDMI terminal 341 of the communication section 34. The CPU 361 further transmits the sound format signal of the voltage value corresponding to the format of the sound signal transmitted from the source equipment 300 to the sink equipment 400 through the first sound format line L4 and the second sound format line L5 of the HDMI cable C2.

At Step T13, when the CPU 471 of the sink equipment 400 receives the image format signal transmitted through the hot plug line L3 of the HDMI cable C2 and the sound format signal transmitted through the first sound format line L4 and the second sound format line L5 of the HDMI cable C2 with the HDMI terminal 411 of the communication section 41, the CPU 471 recognizes the connection of the source equipment 300 on the basis of the received image format signal at Step T14. Then, at Step T15, the CPU 471 makes the voltage detection circuit (not shown) detect the voltage values of the received image format signal and the sound format signal, and judges the formats of the image signal and the sound signal transmitted from the source equipment 300 on the basis of each of the detected voltage values. At Step T16, the CPU 471 stores and sets the formats judged as the formats of the image signal and the sound signal transmitted from the source equipment 300 into the set format storage section 4722e. Then, at Step T17, the CPU 471 starts the setting processing of the image output in the image processing section 22 and the setting processing of the sound output in the sound processing section 23 on the basis of the set formats. Moreover, when the CPU 471 starts the setting processing in the image processing section 22 and the sound processing section 23, the CPU 471 transmits the EDID pertaining to the formats of the corresponding image signal and the sound signal of the sink equipment 400 to the sink equipment 400 through the DDC line L2 of the HDMI cable C2 on the basis of the EDID stored in the EDID storage section 4722a at Step T18.

At Step T19, when the CPU 361 of the source equipment 300 receives the EDID transmitted through the DDC line L2 of the HDMI cable C2 with the HDMI terminal 341 provided in the communication section 34, the CPU 361 performs the confirmation processing to judge whether the sink equipment 400 can deal with the format of the image signal to be transmitted and the format of the sound signal to be transmitted or not on the basis of the received EDID at Step T20.

While the confirmation of the EDID is being performed in the source equipment 300, the CPU 471 of the sink equipment 400 ends the setting processing of the image output in the image processing section 22 and the setting processing of the sound output in the sound processing section 23 at Step T21 after the transmission of the EDID, and releases the image muting and the sound muting in the not-shown muting circuit at Step T22.

Then, at Step T23, the CPU 361 of the source equipment 300 performs the processing of converting the format of the image signal reproduced in the reproduction section 11 and decoded in the decoder section 12 into the format of the image signal that the sink equipment 200 can display and the format of the sound signal in the format conversion section 33, and transmits the processed image signal and the sound signal to the sink equipment 400 through the TMDS line L1 of the HDMI cable C2 to end the present processing. Then, at Step T24, the CPU 471 of the sink equipment 400 receives the image signal and the sound signal transmitted from the source equipment 300 with the HDMI terminal 411 of the communication section 41, and makes the display 24a display the image based on the received image signal, and makes the speaker 25a of the sound output section 25 output the sound based on the sound signal to end the present processing.

According to the signal input system B of the second embodiment described above, in the source equipment 300, the image format signal of the voltage value corresponding to the format of an image signal is transmitted to the sink equipment 400 through the hot plug line L3 in the HDMI cable C2 by the execution of the image format signal transmission program 363a by the CPU 361. The sound format signal of the voltage value corresponding to the format of a sound signal is transmitted to the sink equipment 400 through the first sound format line L4 and the second sound format line L5 of the HDMI cable C2 by the execution of the sound format signal transmission program 363b. Moreover, in the sink equipment 400, the image format signal transmitted through the hot plug line L3 by the execution of the image format signal transmission program 363a is received by the execution of the image format signal reception program 473a by the CPU 471, and the sound format signal transmitted through the first sound format line L4 and the second sound format line L5 by the execution of the sound format signal transmission program 363*b* is received by the execution of the sound format signal reception program 473*b*. Moreover, the format of the image signal is judged on the basis of the voltage value of the image format signal received by the execution of the image format signal reception program 473*a* by the execution of the judging program 473*c*, and the format of the sound signal is judged on the basis of the voltage value of the sound format signal received by the execution of the sound format signal reception program 473*b*. The setting of an image output and the setting of a sound output are executed on the basis of a judgment result by the execution of the judging program 473*c* by the execution of the setting program 473*d*. Furthermore, the hot plug line L3 is a line to perform the transmission and the reception of a hot plug signal indicating the connection of the source equipment 300 and the sink equipment 400 to each other, and the image format signal has the function of a hot plug signal.

Consequently, when the source equipment 300 and the sink equipment 400 are connected to each other, the image format signal of a voltage value, which indicates the connection of both the pieces of equipment 300 and 400 and corresponds to the format of an image signal, is transmitted from the source equipment 300 to the sink equipment 400 through the hot plug line L3 of the HDMI cable C2, and the sound format signal of the voltage value corresponding to the format of a sound signal is transmitted through the first sound format line L4 and the second sound format line L5 of the HDMI cable C2. Consequently, in the signal input system B, in which the source equipment 300 and the sink equipment 400 are mutually connected with the HDMI, the setting processing of an image output and the setting processing of a sound output in the sink equipment 400 are enabled to start at the timing after the mutual connection of both the pieces of equipment, and the time up to the image output and the sound output after the mutual connection of both the pieces of equipment can be shortened.

Incidentally, the present invention is not limited to the aspects of the aforesaid embodiments, but various improvements and the changes of designs may be performed without departing from the scope of the present invention.

For example, the signal input system B of the second embodiment is configured to perform the transmission and the reception of a sound format signal indicating an audio type and a sound format signal indicating a sampling frequency through two lines. However, the transmission method of the sound format signal indicating the format of a sound signal is not limited to the above method, but, for example, two kinds of sound format signals may be alternately transmitted and received at a predetermined period by one line.

Moreover, the signal input system B of the second embodiment is configured to set the function as a hot plug signal to the image format signal as the first format signal, but the sound format signal as the second format signal may have the function as the hot plug signal.

Moreover, in the signal input systems A and B, when it is judged that the sink equipment 200 and 400 cannot deal with the formats of the image signals transmitted from the source equipment 100 and 300, respectively, on the basis of the format signals transmitted from the source equipment 100 and 300 to the sink equipment 200 and 400, respectively, then the signal input systems A and B may be configured to perform the setting processing in the image processing section 22 on the basis of the format having the highest resolution among the formats that the sink equipment 200 and 400 can deal with.

According to a first aspect of the preferred embodiments of the present invention, there is provided a signal input system to input an image signal from source equipment to sink equipment through a High Definition Multimedia Interface, wherein the source equipment comprises a transmission section to transmit a format signal to the sink equipment through a predetermined first line in the High Definition Multimedia Interface, the format signal having a voltage value corresponding to a format of the image signal and the sink equipment comprises:

a reception section to receive the format signal transmitted through the first line by the transmission section;

a judging section to judge the format of the image signal based on the voltage value of the format signal which is received by the reception section; and a setting section to set an image output based on a judgment result of the judging section.

Preferably, the first line is a line to perform a transmission and a reception of a hot plug signal which indicates that the source equipment and the sink equipment are connected to each other, and the format signal has a function as the hot plug signal.

Preferably, the source equipment comprises a second transmission section to transmit a second format signal to the sink equipment through a predetermined second line in the High Definition Multimedia Interface, the second format signal having a voltage value corresponding to a format of a sound signal, and the sink equipment comprises:

a second reception section to receive the second format signal transmitted through the second line by the second transmission section;

a second judging section to judge the format of the sound signal based on the voltage value of the second format signal which is received by the second reception section; and a second setting section to set a sound output based on a judgment result of the second judging section.

According to a second aspect of the preferred embodiments of the present invention, there is provided a signal input system to input an image signal and a sound signal from source equipment to sink equipment through a High Definition Multimedia Interface, wherein the source equipment comprises:

a first transmission section to transmit a first format signal to the sink equipment through a predetermined first line in the High Definition Multimedia Interface, the first format signal having a voltage value corresponding to a format of the image signal; and a second transmission section to transmit a second format signal to the sink equipment through a predetermined second line in the High Definition Multimedia Interface, the second format signal having a voltage value corresponding to a format of the sound signal, and the sink equipment comprises:

a first reception section to receive the first format signal transmitted through the first line by the first transmission section;

a second reception section to receive the second format signal transmitted through the second line by the second transmission section;

a first judging section to judge the format of the image signal based on the voltage value of the first format signal which is received by the first reception section;

a second judging section to judge the format of the sound signal based on the voltage value of the second format signal which is received by the second reception section;

a first setting section to set an image output based on a judgment result of the first judging section; and a second setting section to set a sound output based on a judgment result of the second judging section, and wherein the first line is a line to perform a transmission and a reception of a hot plug signal which indicates that the source equipment and the sink equipment are connected to each other, and either one of the first format signal and the second format signal has a function as the hot plug signal.

According to the embodiments of the present invention, in source equipment, a transmission section transmits a format signal of a voltage value corresponding to a format of an image signal to sink equipment through a predetermined first line in HDMI, and in the sink equipment, a reception section receives the format signal transmitted through the first line by the transmission section, a judging section judges the format of the image signal on a basis of the voltage value of the format signal received by the reception section, and a setting section sets an image output on a basis of a judgment result of the judging section.

Consequently, in the source equipment and the sink equipment, which are connected to each other with an HDMI terminal, through which the image signal can be input, the sink equipment detects the format of the image signal transmitted from the source equipment on the basis of the format signal transmitted through the first line in timing after the connection of the pieces of equipment with each other, and thereby the time until an image output after the connection of the pieces of equipment with each other can be shortened.

The entire disclosure of Japanese Patent Application No. 2007-132861 filed on May 18, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A signal input system to input an image signal from source equipment to sink equipment through a High Definition Multimedia Interface, wherein:
    the source equipment comprises a transmission section to transmit a format signal to the sink equipment through a predetermined first line in the High Definition Multimedia Interface, the format signal having a voltage value corresponding to a format of the image signal;
    the sink equipment comprises:
        a reception section to receive the format signal transmitted through the first line by the transmission section;
        a judging section to judge the format of the image signal based on the voltage value of the format signal which is received by the reception section; and
        a setting section to set an image output based on a judgment result of the judging section; and
    wherein
        the first line is a line to perform a transmission and a reception of a hot plug signal which indicates that the source equipment and the sink equipment are connected to each other; and
        the format signal has a function as the hot plug signal.

2. The signal input system according to claim 1, wherein the source equipment comprises a second transmission section to transmit a second format signal to the sink equipment through a predetermined second line in the High Definition Multimedia Interface, the second format signal having a voltage value corresponding to a format of a sound signal, and
    the sink equipment comprises:
        a second reception section to receive the second format signal transmitted through the second line by the second transmission section;
        a second judging section to judge the format of the sound signal based on the voltage value of the second format signal which is received by the second reception section; and
        a second setting section to set a sound output based on a judgment result of the second judging section.

3. The signal input system according to claim 1, wherein a format of the image signal indicated by the format signal concerns the number of scanning lines of the image signal, and the scanning method of the image signal.

4. A signal input system to input an image signal and a sound signal from source equipment to sink equipment through a High Definition Multimedia Interface, wherein
    the source equipment comprises:
        a first transmission section to transmit a first format signal to the sink equipment through a predetermined first line in the High Definition Multimedia Interface, the first format signal having a voltage value corresponding to a format of the image signal; and
        a second transmission section to transmit a second format signal to the sink equipment through a predetermined second line in the High Definition Multimedia Interface, the second format signal having a voltage value corresponding to a format of the sound signal, and
    the sink equipment comprises:
        a first reception section to receive the first format signal transmitted through the first line by the first transmission section;
        a second reception section to receive the second format signal transmitted through the second line by the second transmission section;
        a first judging section to judge the format of the image signal based on the voltage value of the first format signal which is received by the first reception section;
        a second judging section to judge the format of the sound signal based on the voltage value of the second format signal which is received by the second reception section;
        a first setting section to set an image output based on a judgment result of the first judging section; and
        a second setting section to set a sound output based on a judgment result of the second judging section, and wherein
        the first line is a line to perform a transmission and a reception of a hot plug signal which indicates that the source equipment and the sink equipment are connected to each other, and
        either one of the first format signal and the second format signal has a function as the hot plug signal.

5. The signal input system according to claim 4, wherein a format of the image signal indicated by the format signal concerns the number of scanning lines of the image signal, and the scanning method of the image signal.

* * * * *